Aug. 22, 1939.     J. W. BRYCE     2,170,544
MULTIPLYING MACHINE AND IMPULSE EMITTER THEREFOR
Filed June 28, 1935     9 Sheets-Sheet 1

INVENTOR
James W. Bryce
BY
Cooper, Kerr & Dunham
ATTORNEYS

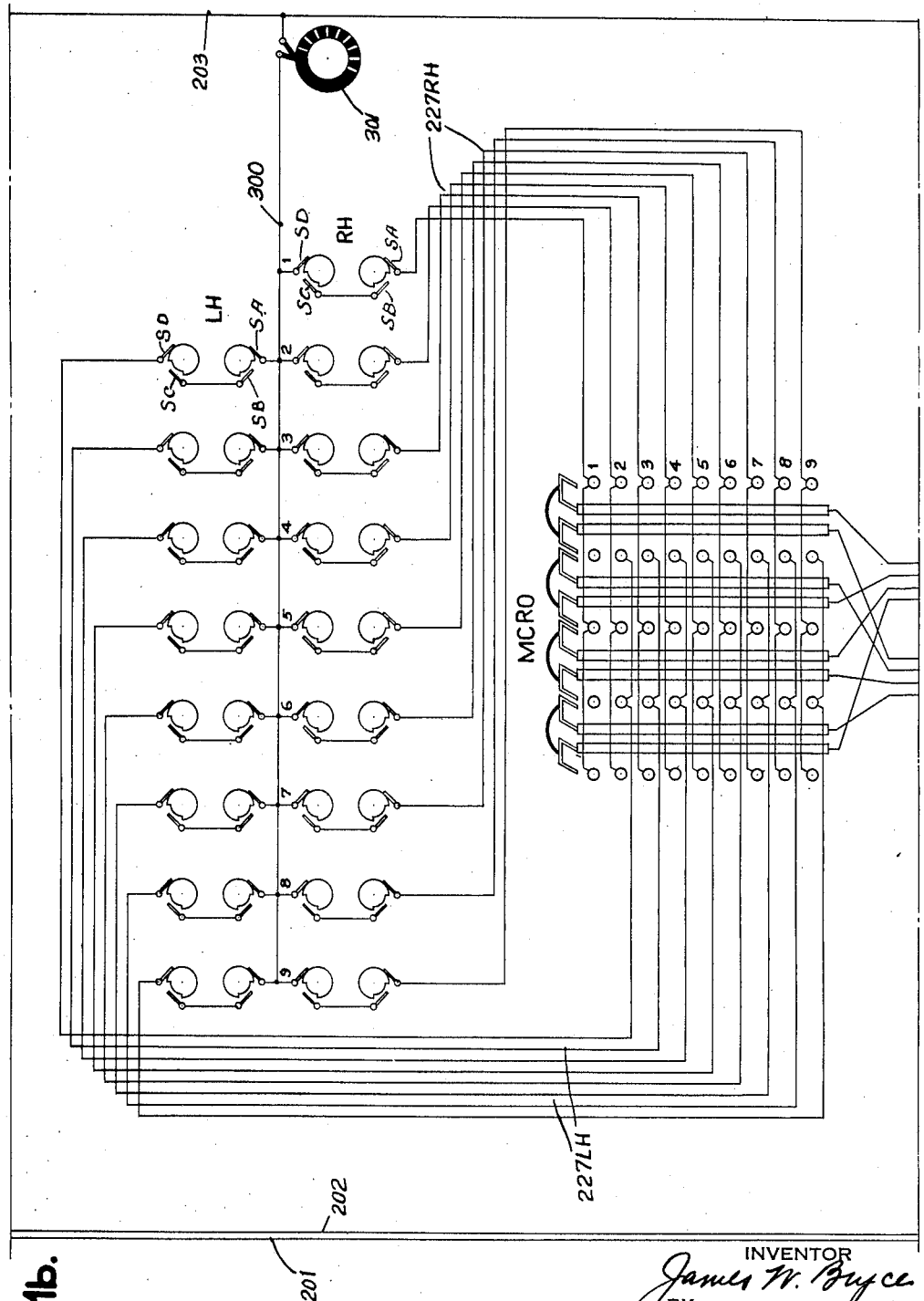

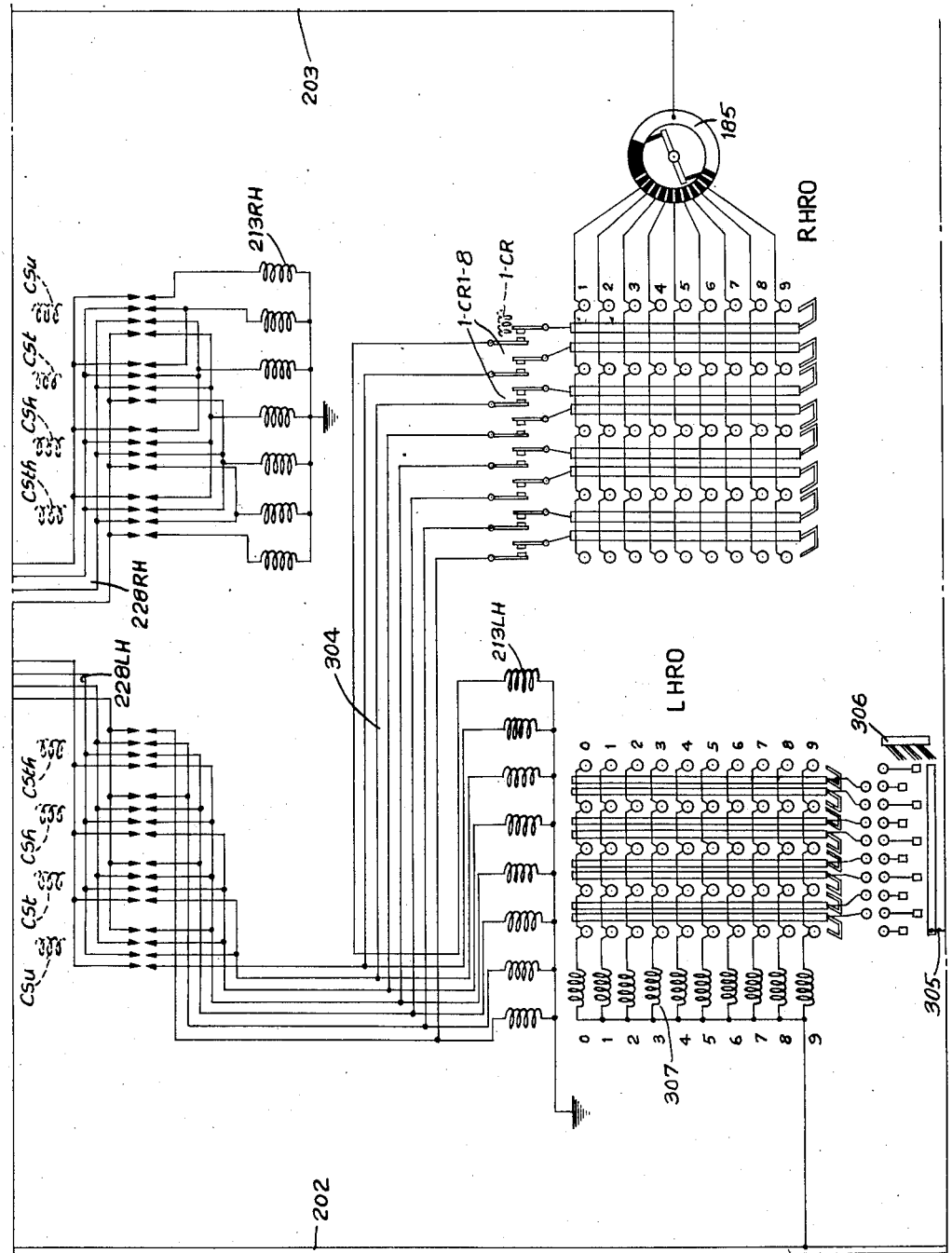

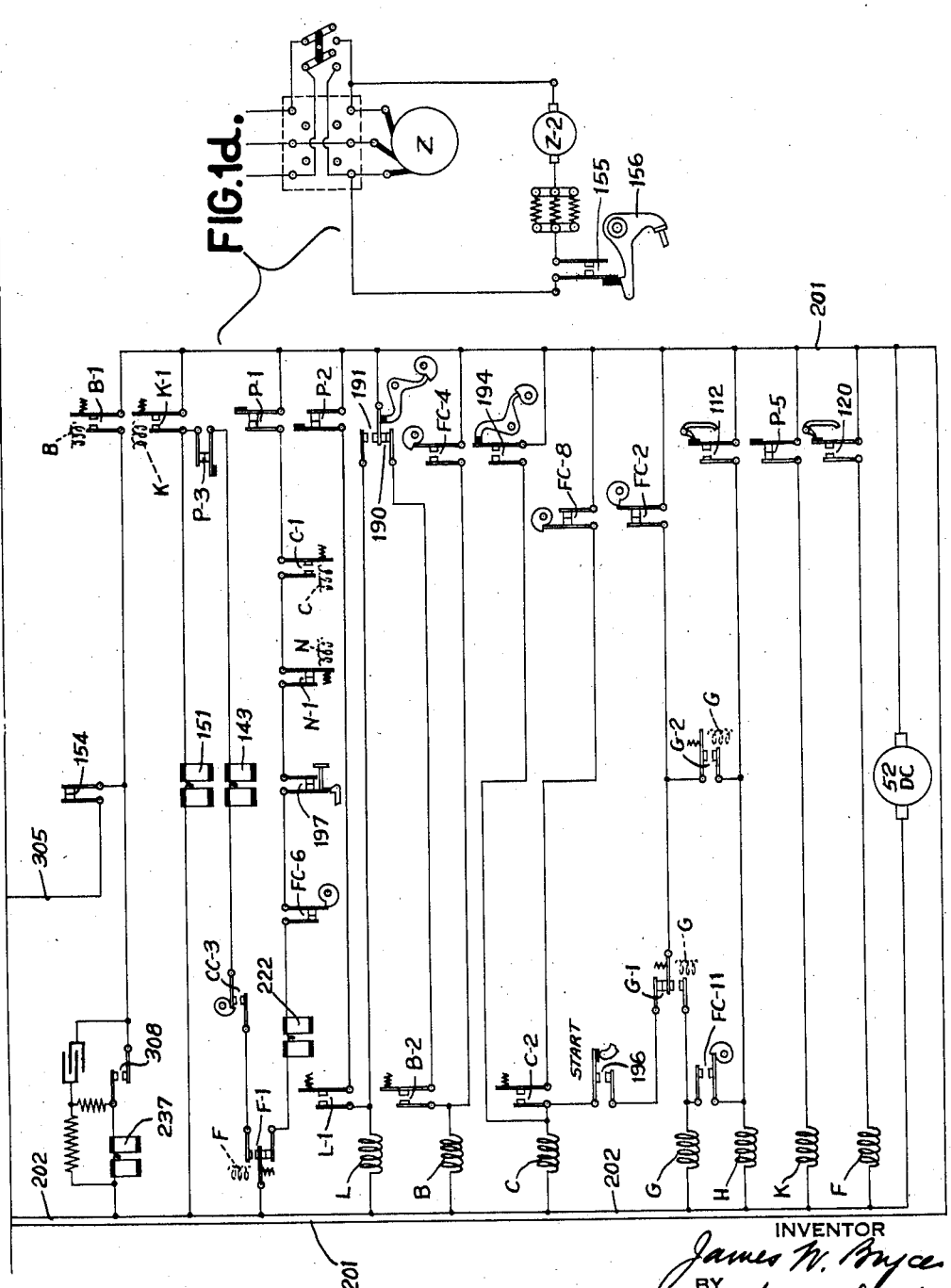

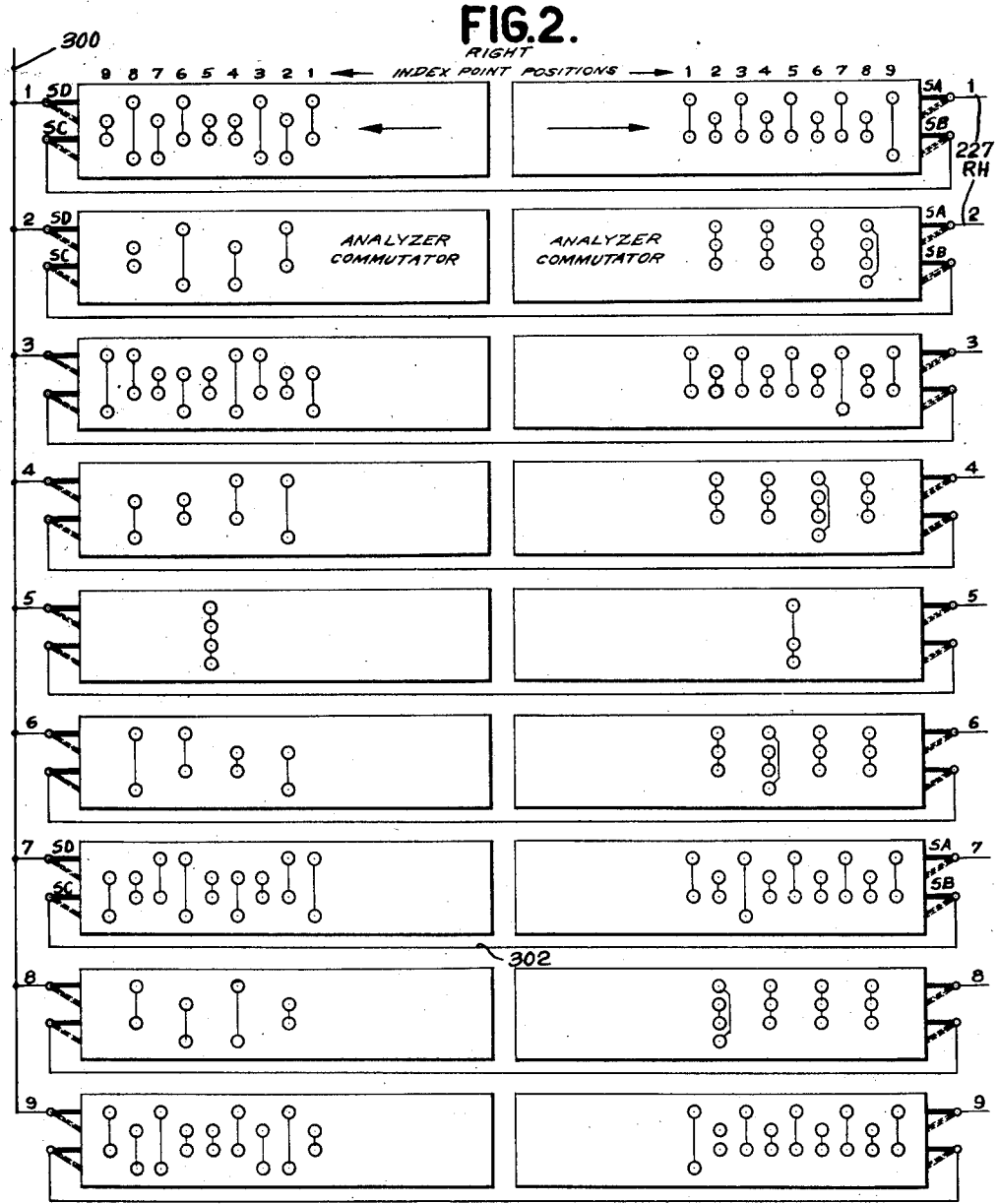

Aug. 22, 1939.　　　　J. W. BRYCE　　　　2,170,544
MULTIPLYING MACHINE AND IMPULSE EMITTER THEREFOR
Filed June 28, 1935　　　　9 Sheets-Sheet 7
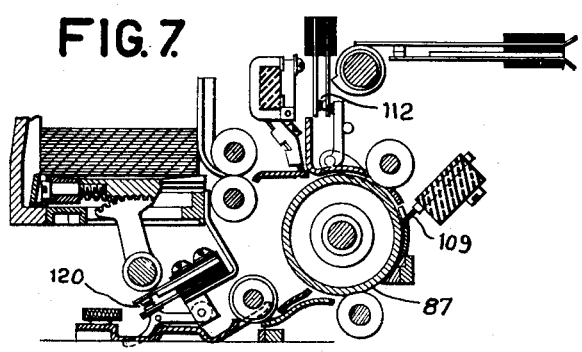
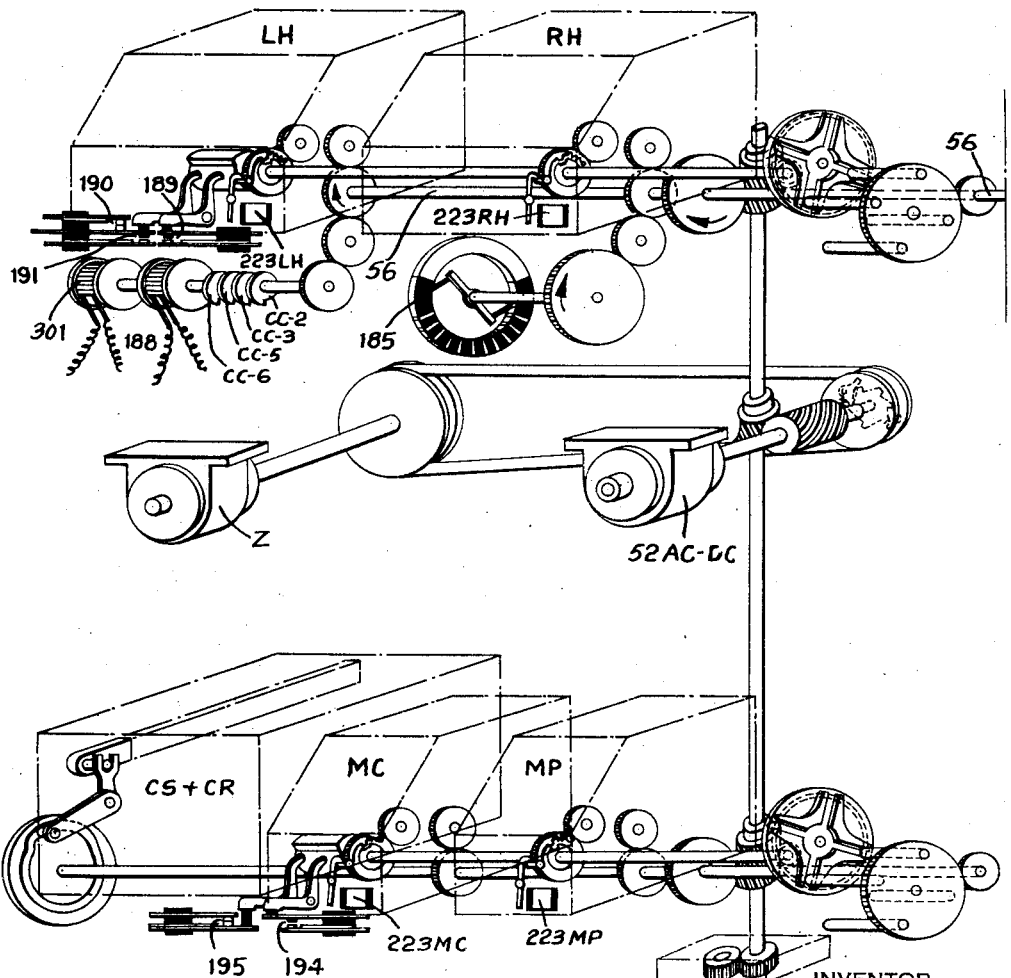

Aug. 22, 1939.    J. W. BRYCE    2,170,544
MULTIPLYING MACHINE AND IMPULSE EMITTER THEREFOR
Filed June 28, 1935    9 Sheets-Sheet 8
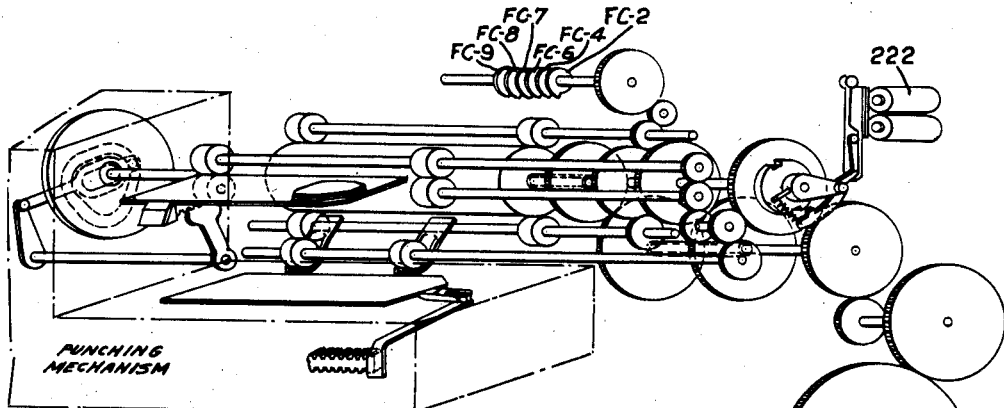
FIG. 6a.
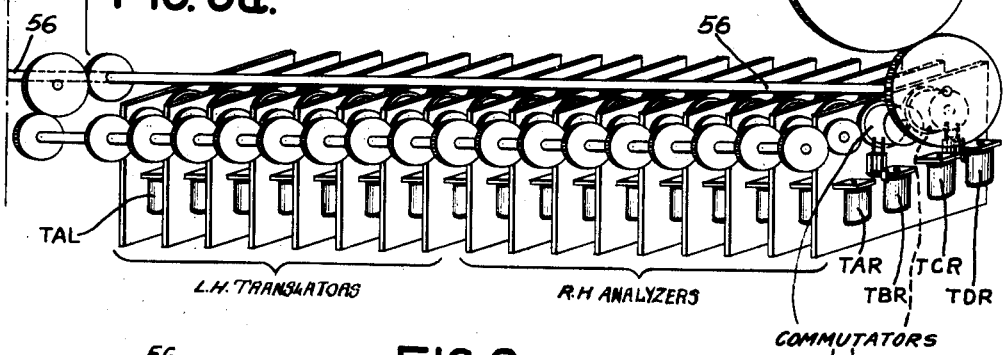
FIG. 8.
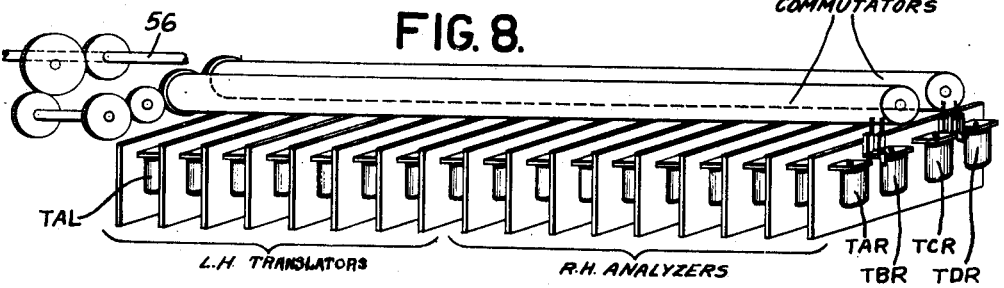
FIG. 9.
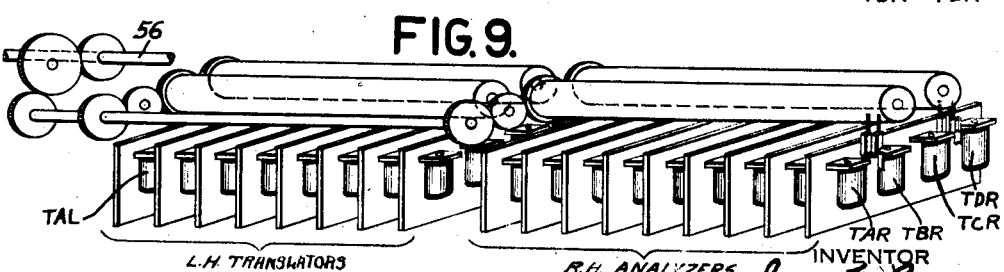

Aug. 22, 1939.  J. W. BRYCE  2,170,544
MULTIPLYING MACHINE AND IMPULSE EMITTER THEREFOR
Filed June 28, 1935  9 Sheets-Sheet 9
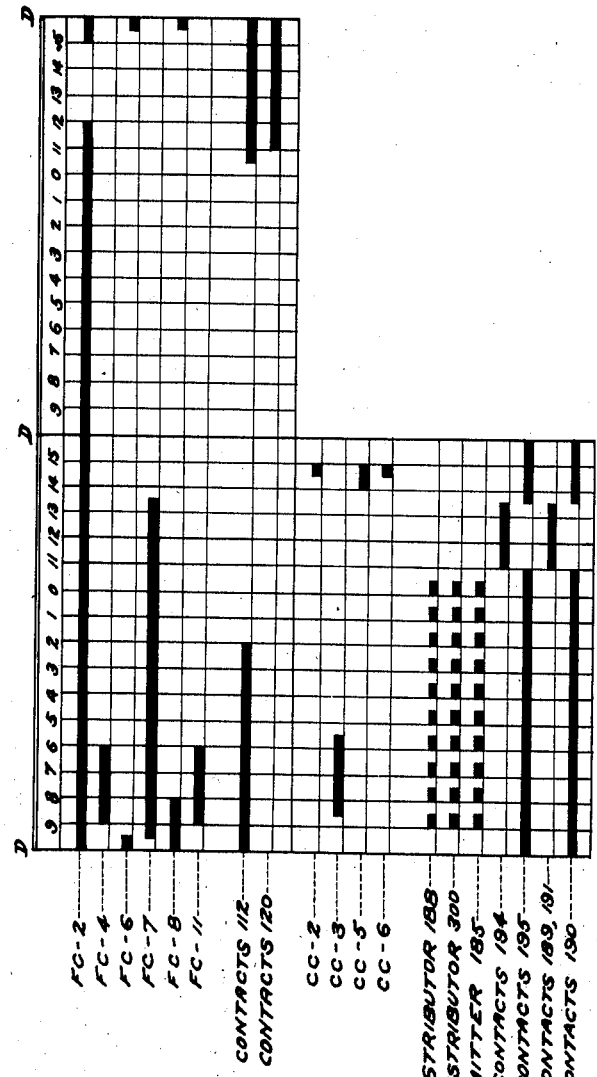

Patented Aug. 22, 1939

2,170,544

UNITED STATES PATENT OFFICE 2,170,544

MULTIPLYING MACHINE AND IMPULSE EMITTER THEREFOR

James W. Bryce, Bloomfield, N. J., assignor to International Business Machines Corporation, New York, N. Y., a corporation of New York Application June 28, 1935, Serial No. 28,805

7 Claims. (Cl. 235—61)

This invention relates to improvements in accounting machines and more particularly to improvements in differentially timed impulse multiplying machines and to impulse emitting and selecting means therefor. Heretofore, in such machines, impulse emission has been effected generally in two ways. According to one construction multiple section impulse emitting commutators were employed with selective arrangements in the form of relays or brush shifting devices to select circuits to the various commutator sections. According to another arrangement a single impulse emitter was provided which emitted impulses through multiplier relay contacts which effected impulse selection.

According to, and among the objects of the present invention, a commutator is provided having conducting surfaces or spots thereon with groups of spots electrically connected upon the commutator. In maintained contact with the periphery of the commutator are brushes including input brushes, output brushes and supplemental brushes, which brushes are selectively shiftable with respect to the commutator by combinational settings, which combinational settings are individually related to the various digital values of one of the factors entering into the computation, for example the multiplier. By such combinational settings of the brushes various different conducting spot portions of the commutator are rendered effective for impulse emission of product representing impulses. Furthermore, according to the present invention the output brushes of the commutator are fixedly related and electrically connected to lines which are individually related to the digital values of one factor or component of the calculations, for example, the multiplicand factor.

Furthermore, according to the present invention the commutator is arranged in two more sub-sections, one for left hand component impulses and another for right hand component impulses and each main sub-section is furthermore sub-divided into further minor sub-sections each correlated to an output line from the commutator. All of the input circuits to the input brushes of the commutator may be connected to a common supply line.

A further object of the present invention resides in the provision of an improved multiplying commutator for a differentially timed impulse type of multiplying machine.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawings:

Figures 1a, 1b, 1c and 1d, taken together and arranged vertically in the order named, show the circuit diagram of the machine;

Fig. 2 shows the wiring arrangement for the analyzers and the disposition of the spots on the translator commutators for emitting right hand components of products;

Fig. 3 shows the combinational code utilized with the translators of Fig. 2;

Figs. 6 and 6a show somewhat diagrammatically the structural arrangement of the devices of the instant machine and the manner of drive of the various devices in the different sections;

Fig. 7 is a sectional view showing the card handling and feeding section of the machine and the sensing means;

Figs. 8 and 9 show diagrammatically various modified arrangements of translator commutators. Fig. 10 shows a cam timing diagram of the machine.

Figure 1A:
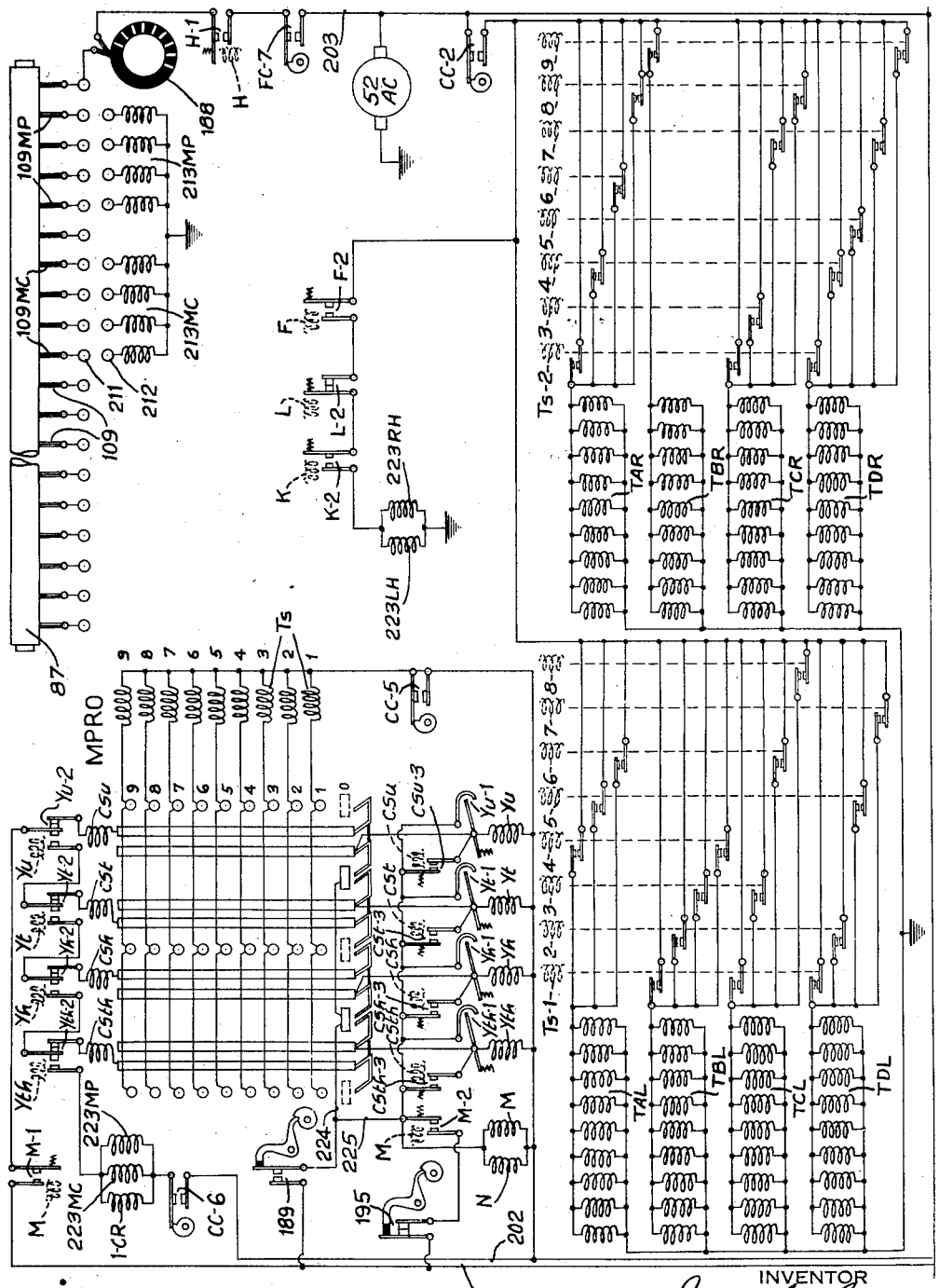

Previously, in the multiplying machine art, in machines of the general type in which product representing differentially timed impulses were used for controlling the operation of product accumulating means, it has been the practice to utilize multiplying commutators wherein impulses as initially created at the multiplying commutator were coordinated with progressions based upon the multiplier digit. Typical machines of this sort are shown in British Patents Nos. 303,062, dated December 24, 1928, and 304,599, dated January 19, 1929. Other machines have also been provided wherein an impulse emitter was utilized to emit impulses through multiplying relays, the multiplying relays being selected for operation according to the value of the multiplier digit. Typical machines of this type are shown in British Patent No. 358,105.

The present invention contemplates an arrangement which differs from both of the foregoing previously known arrangements. In lieu of using a multiplying commutator and also in lieu of using an impulse emitter and multiplying relays, according to the present invention translators are utilized for selecting which impulses are to be available for emission and for applying relative differential timing characteristics thereto. Such translators are continuously in operation with the machine in operation and the coding of the spots of the translators is such that the proper product representing impulses are transmitted to the lines leading to the selecting devices MCRO which selectively control impulse flow according to the amount of the entered and manifested multiplicand. Selecting means controlled in accordance with an entered and manifested multiplier factor are likewise used which selectively call combinations of translator brush shifting magnets into operation according to the digit value of the multiplier being used in the multiplication.

The machine to which the present invention is shown as applied, is of a type well known in the art and for this reason no detailed mechanical description of the same is necessary. Reference may be had to United States patents to Cunningham, No. 1,933,714 and Oldenboom, No. 1,944,665 and British Patent No. 405,031, for full details as to the mechanical arrangement of card handling mechanism, accumulators, punching devices, etc. Figs. 6 and 6a show generally the structural relation of the parts of the instant machine and similar reference numerals are applied thereto to correspond to the reference characters used in the circuit diagram.

For details of the mechanical arrangement of the translators, reference may be had to United States patent to Bryce, No. 1,880,409, which shows and describes the complete details of the translators used in the present machine. These translators are driven in the customary manner from the main counter drive shaft of the machine. A form of drive for the individual translators may be that shown in Fig. 9 of British Patent No. 303,517. The translators may receive their drive from drive shaft 56 (see Fig. 6a) and are so arranged that the commutators make one revolution per counter cycle.

In lieu of utilizing individual commutators, a common commutator or common commutators may be provided having the conducting spots disposed as shown for the individual commutator. This will provide for simplification of drive. If desired, a separate commutator may be provided for left hand and right hand components or a single commutator may be used with a left hand component section and a right hand component section. Such alternative arrangements are diagrammatically illustrated in Figs. 8 and 9.

Referring to Fig. 1a of the diagram, 87 designates the contact roll. Cooperating with this contact roll are the usual sensing brushes, generally designated 109, those designated 109MP being allotted to the multiplier and those designated 109MC being allotted to the multiplicand.

The customary plug connections are made from sockets 211 to 212 to provide for the entry of the multiplicand and multiplier amounts into the respective entry devices. 213MP and 213MC designate the counter magnets for the multiplier and multiplicand entry devices. The usual impulse distributor 188 is provided which receives impulses through relay contacts H—1 and through cam contacts FC—1 from the A. C. line 203 which is fed from the A. C. generator designated 52AC. The multiplier entry device is provided with a readout section designated MPRO. The column shift and cycle controller circuits are of conventional form and need not be described in detail. The cycle controller comprises relay magnets Yu, Yt, etc., with control contacts Yu—1, Yt—1, etc. and contacts Yu—2, Yt—2, etc., and the customary column shift magnets CSu, CSt, etc., are provided controlling contacts CSu—3, CSt—3, etc. The column shift relays also control the closure of the multi-contacts shown on Fig. 1c for column shift purposes. The cycle controller includes the customary relays N and M. The pick-up circuit for the relay coils of the cycle controller including M and N is through LH reset control contacts 189. Contacts 195 are provided which are opened on MC reset for breaking down the set up of the cycle controller. Reset controlling magnets 223MC, 223MP and 1CR are provided as in the Oldenboom patent.

In lieu of extending the transverse bus circuits of the MPRO readout directly to the multiplier relays as previously, such circuits are extended to translator selector relays. Such translator selector relays are generally designated TS in Fig. 1a and are individually designated TS—1, TS—2, etc., the suffix designates the related numerical value of the multiplier digit. For example, if TS—4 is energized, the corresponding multiplier is 4. The circuit through these relays is completed upon closure of cam contacts CC—5 and relay contacts M—1 from DC line 202. The DC generator 52DC (Fig. 1d) supplies buses 201 and 202 in the usual manner.

The translators used in the instant machine are of the four magnet type. As customary in the designations of translators, the different coils of an individual translator are designated A B, C and D. Furthermore, in the instant machine there is one set of translators for emitting right hand components of products and another set of translators for emitting left hand components of products. The brush shifting magnets of the translators will accordingly be designated TAL, TBL, TCL and TDL, as pertaining to the left hand component translator brush shifting magnets and TAR, TBR, TCR and TDR as pertaining to the right hand component translator brush shifting magnets. The selective operation of the translators can best be described by taking a typical problem.

Assume that the multiplier digit was 4. The TS—4 translator selector magnet would thereupon be energized and effect closure of the two contacts shown directly below the TS—4 magnet. The closure of such two relay contacts would bring about energization of all of the TAL translator brush shifting magnets and all of the TBL brush shifting magnets upon closure of cam contacts CC—2. Considering now the translator operation for right hand components with 4 as the multiplier digit, the energization of TS—4 would close the two relay contacts associated with TS—4 and bring about the energization of the TAR and the TDR translator brush shifting magnets.

Figures 4, 5:
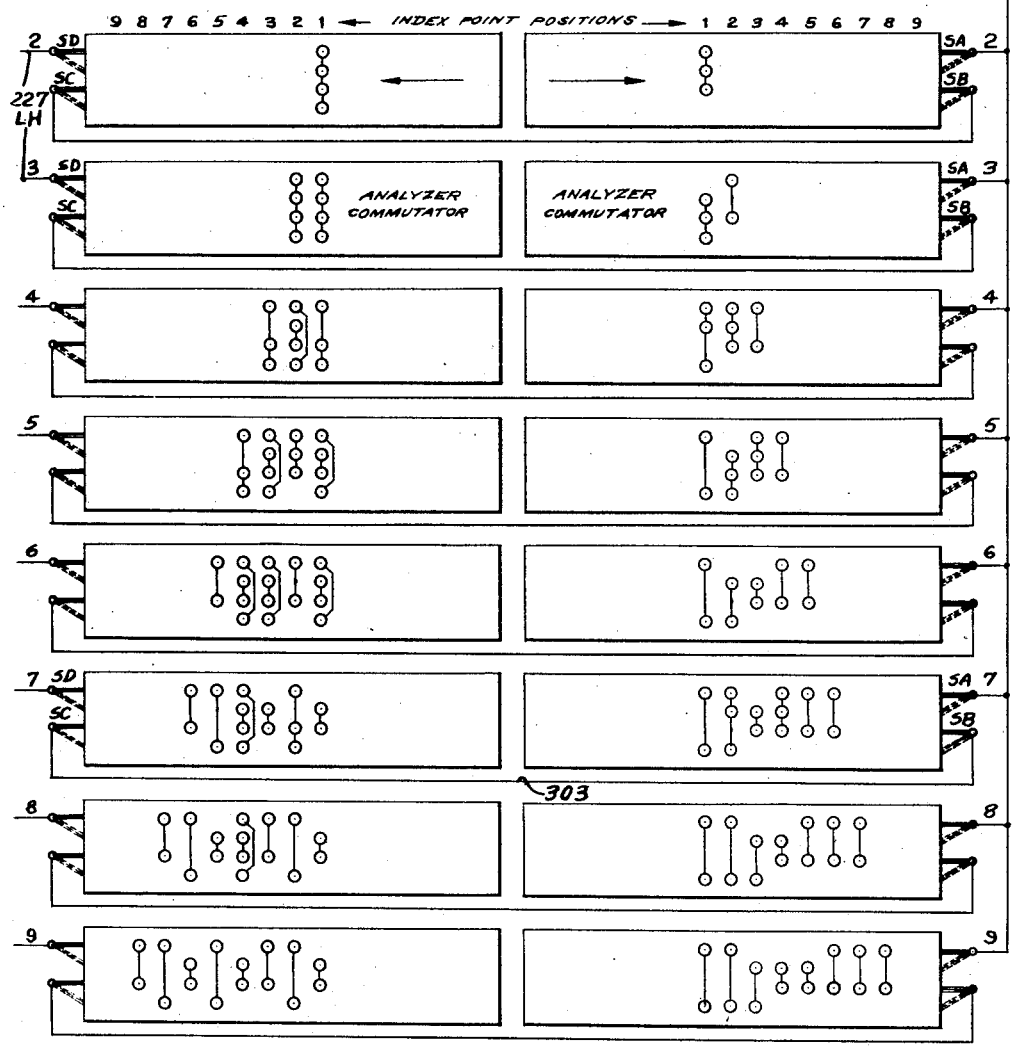
Fig. 4 shows the analyzers, the wiring of the commutator spots, etc., which are utilized for emitting left hand components of products.
Fig. 5 shows the combinational code utilized with the translators of Fig. 4.

The coding arrangement for the translator selector relay contacts is shown in Fig. 3 for the right hand contacts and in Fig. 5 for the left hand contacts.

The translators have the usual shifting brushes designated SA, SB, SC and SD and shown on Figs. 2 and 4. In these figures the full line position of the brushes shows the normal position and the dotted line position shows the shifted position which is attained upon the corresponding translator brush shifting magnet being energized. The translator commutators are provided with spots wired as shown in Figs. 2 and 4. The arrangement of these spots is such as to cause the emission from the translator commutator of the proper product representing impulses. Let it be assumed that the multiplier digit is 4 and that the multiplicand digit amount is 7. With 4 as the amount of the multiplier, all of the TAR and all of the TDR brush shifting magnets will be energized to shift all of the SA and SD brushes of the right hand component translators with respect to their commutators from the full line to the dotted line position. The circuit designated 300 is the common input circuit to the translator brushes. Such input circuit (see Fig. 1b) extends through an impulse distributor 301 to the 203AC line.

Referring now to Fig. 2 at the extreme right there are a number of output lines 227RH respectively, numbered 1 to 9 inclusive, these are the output lines which lead to the multiplicand selector MCRO of Fig. 1b.

Considering now the SA and SD brushes shifted, it will be noted that as the translator commutators revolve that a circuit will be completed at the 8 index point position of the translator commutator, through the shifted SD brush, through the spot on the commutator, thence via the wiring in the commutator to the other spot on the commutator, through the non-shifted SC brush, over via wire 302 to the non-shifted SB brush, thence via the spots and the wiring on the commutator to the shifted output SA brush and out on the 7 line. By this operation, an impulse will be emitted at the 8 index point position to the number 7 bus of the MCRO readout. Such impulse will be transmitted through the readout provided the brush of the readout stands on 7. It will be recalled that the multiplying problem is 4 as the multiplier and 7 as the multiplicand and it will be appreciated that 8 is the desired right hand component impulse which must flow to the right hand product accumulator.

Considering now the action for the left hand components with the same problem, in this instance the shifted brushes will be the SA and SB brushes. An impulse will flow in through the supply line 300 to the shifted SA input brush of the number 7 commutator and at the 2 index point position such impulse will flow over by the commutator spots and wiring and out via the shifted SB brush, via wire 303 to the non-shifted SC brush and at the 2 index point position of the translator commutator over via the conducting spots and wiring and out through the non-shifted SC output brush to the line of the 227LH group designated 7 which extends to the left hand readout section of the MCRO readout. With a brush of the readout standing at 7, a 2 representing impulse will flow through the readout to the left hand product accumulator provided the multiplication is by 4.

Referring again to Fig. 1b, it will be noted that a translator is provided associated with the right hand component 9 bus line leading into the MCRO readout. Another 9 translator is associated with the 9 left hand input bus line leading into this MCRO readout. Such two translators are adaptable to emit into the respective bus lines any and all product impulses where the multiplicand is 9. The particular impulses which will actually flow on the respective bus lines will, however, be determined by the amount of the multiplier which in turn selects coded combinations of brushes for co-action with the respective translator commutators. If the multiplicand is 9 and the multiplier is 2, an 8 impulse will flow into MCRO on the right hand 9 line and a 1 impulse will flow in on the left hand line and so on for all multiplier digits. Expressed otherwise, a given translator has the potential capability of rendering available impulses for any given multiplicand digit multiplied by any multiplier digit, and such impulses flow out of the translator over a single output line. The selection of which impulse is to flow on such line depends upon the amount of the multiplier which makes a coded combinational selection of brushes for emitting the proper product representing impulses.

As shown in Fig. 1b, there are eight translators for left hand component impulses and nine translators for right hand component impulses. There is one less left hand translator because there is no left hand component of one multiplied by any other number.

Impulse flow through the MCRO readout which comprises an impulse flow selecting means is effected in the customary manner and from such readout the left hand component impulses flow by lines designated 228LH to the column shift relay contacts and therethrough to the 213LH accumulator magnets. Similarly the right hand component impulses leaving the MCRO readout flow by lines designated 228RH through the column shift relay contacts to the 213RH accumulator magnets. As is customary in machines of this class multiplication proceeds column by column of the multiplier under the control of the cycle controller and after multiplication is complete provision is made for gathering together all of the results into the LH accumulator. This is brought about under the control of the cycle controller in the customary manner when relay coil 1—CR (Fig. 1a) becomes energized. With such relay coil energized, relay contacts 1—CR—1 to 8 (Fig. 1c) become closed whereupon with the emitter 185 in operation impulses will flow through the RHRO readout out via the transfer lines 304 and to the 213LH counter magnets. In this manner the amount of the right hand components will become added to the amount of the left hand components.

Having described the general manner in which product representing impulses are created and entered into the products accumulator and finally entered into the left hand section of the products accumulator, the complete circuit diagram will now be described.

With the machine plugged up in the previously indicated manner and with cards in the supply magazine of the machine, the operator depresses the start key and closes start key contacts 196 (Fig. 1d). Closure of these contacts completes a circuit through relay coil C and through relay contacts G—1 now closed and through cam contacts FC—2. A stick circuit is established through contacts C—2 of the C relay and through cam contacts FC—3 now closed. Energization of coil C also closes relay contacts C—1 and a circuit is established to energize the card feed clutch magnet 222. The circuit is completed from the 202 side of the DC line through relay contacts F—1, in the position shown, through the card feed clutch magnet 222, through cam contacts FC—6 now closed, through stop key contacts 197 now closed, through relay contacts N—1 and C—1 now closed, through contacts P—1 of the punch, now closed, to the other side of the DC line 201.

The start key is held depressed until after the second card feed cycle is initiated and until after card lever contacts 112 are closed, causing energization of relay coil H. Energization of H closes relay contacts H—1 (Fig. 1a). As the second card feed cycle ensues, the card is carried past the brushes 109 and the amount of the multiplier and of the multiplicand are read from the card and entered into their respective entry devices. Such entry circuits need not be here traced as they have been previously described.

While there is a manual starting up of card feed for the initial card handling cycles, on subsequent card handling cycles card feed is automatically initiated. Accordingly the hand initiating control is cut off after the initial card handling operations. Early in the second card feed cycle, cam contacts FC—11 (Fig. 1d) close to energize relay coil G and shift relay contacts G—1 to reverse position to interrupt the circuit to the start key contacts 196 but to maintain the circuit to cam contacts FC—2. The energization of G will also close relay contacts G—2 and establish a stick circuit for coils G and H either through the FC—2 cam contacts or the card lever contacts 112.

The first card after being fed through the machine ultimately passes to the entering position of the punch, closing card lever contacts 120, energizing relay coil F and shifting the F—1 contacts. On starting up the machine, contacts P—1, P—3 and P—5 in the punch are closed. With P—5 closed, relay coil K will be energized and contacts K—1 closed. Upon the shifting of contacts F—1 and upon the closure of cam contacts CC—3, a circuit will be established to the punch clutch magnet 143 which circuit is completed through punch contacts P—3 now closed and contacts K—1 which are now closed. The energization of the punch clutch magnet 143 will cause the closure of contacts 155 which become latched closed by a latch 156. In this way current is supplied to the punch driving motor Z—2. Card handling operations are then effected in the punch in the usual manner.

In the present machine the set up of the cycle controller is initiated by the reset of the LH accumulator. At the time this accumulator is reset the RH right hand accumulator is likewise reset in the instant machine. The energization of relay coils F and K causes contacts F—2 and K—2 (Fig. 1a) to close. Upon closure of cam contacts CC—2 current flows from the 203AC line, through CC—2 now closed, through F—2 now closed, L—2 now closed and K—2 now closed, through the 223LH reset magnet and the 223RH reset magnet and back to ground. Energization of 223LH initiates reset of the LH accumulator and such reset occurs with the racks of the punch in extreme outer position. During such LH reset the reset control contacts 191 (Fig. 1d) close and energize relay coil L, causing opening of relay contacts L—2 and preventing a repetition of reset. Although L is only temporarily energized, a stick circuit is established for L through L—1, which stick circuit is completed through punch contacts P—2 now closed.

The cycle controller is set up in the following manner. Upon LH reset a circuit is established from the 201 side of the DC line (Fig. 1a) through the reset contacts 189 of the LH accumulator, through relay coils M and N and back to the 202 side of the DC line. Energization of relay coil M closes relay contacts M—1 and M—2 and the latter contacts establish a stick circuit for the relay coils M and N through the multiplicand reset contacts 195 which are now closed.

*Column skip and cycle controller*

The column skip and cycle controller are of the usual type fully described in the United States patent to George F. Daly, No. 2,045,437, dated June 23, 1936. It is sufficient to here state that if any brush of the multiplier readout stands upon a zero spot, the corresponding Y relay coil of the cycle controller will be energized. Current will flow in from the DC line 201, through the 195 reset contacts, through the relay contacts M—2 now closed, via wire 224, through the zero spots of the MP readout device, then via the corresponding brush or brushes standing on the zero spot or spots, then through the respective circuits shown and back to the 202 side of the DC line. Also connected to one side of relay contacts M—2 is a line 225 which extends over and connects with one side of the CSu—3 to CSth—3 control contacts. The other side of these contacts is wired back to their respective Y relay coils and therethrough to the other side of the DC line. Accordingly, when any Y coil is energized, due to a brush standing on a zero spot in its corresponding column, the energization of this particular Y relay coil will close its Y—1 stick contacts and this Y magnet will remain energized. Assuming that no zero appears in the units column of the amount upon the MP entry device but that a zero appears in the tens column and a significant figure appears in the hundreds column there will be an energization of coil Yt which will shift transfer contacts Yt—2 to reverse position. Yu—2 will not have shifted and Yh—2 will not have shifted.

The machine is now ready to multiply by the amount in the units order of the MP entry device and initiation of multiplication is effected as follows: Energization of relay coil M closes relay contacts M—1 and following the setting up of the cycle controller, cam contacts CC—5 close and current flows from the 201 side of the DC line, through contacts M—1 now closed, through the Yu—2 transfer contacts, in the position shown, down through CSu relay magnet and out via the brush which is standing on say the 4 spot of the MP readout in the units order and out through the TS—4 translator selector relay magnet through cam contacts CC—5 and back to the 202 side of the DC line. There is a concurrent energization of the CSu magnet and the TS—4 translator selector magnet. Energization of the TS—4 translator selector magnet effects combinational selection of the translator brush magnets for shifting and upon operation of the translator commutators the entries are directed in the proper columnar orders of the RH and LH accumulators as previously fully explained. Operations in further columns need not be here described as such operation, except for impulse creation and selection is substantially the same as in the Oldenboom patent previously referred to.

After multiplication is complete the transfer contacts in the cycle controller will all be shifted so that there is an ultimate circuit path from the 201 side of the DC line through relay contacts M—1, through all of the shifted Y—2 set of transfer contacts to the 1—CR relay coil and to the 223MC and 223MP reset magnets at the time the CC—5 contacts close to complete the circuit to the 202 side of the DC line. Energization of 223MP and 223MC initiates reset of the MP and MC counters. Energization of 1—CR brings about closure of related contacts 1—CR—1 to 8 (Fig. 1c) to connect the RHRO readout with the 304 transfer lines. Accordingly upon the operation of the emitter 185, impulses are emitted from the emitter through the RHRO readout, through the 1—CR—1 to 8 contacts to the accumulator magnets 213LH of the LH accumulator. In this way the amount previously in RH is transferred to the LH accumulator in proper columnar relation.

MC and MP reset occurs concurrently with RH and LH transfer and MC reset opens contacts 195 (Fig. 1a) to break the stick circuit for M and N and for all the Y relay coils. During MC reset, contacts 194 (Fig. 1d) become closed to energize relay coil C. Energization of C causes closure of contacts C—1 and there is a new energization of the card feed clutch magnet 222 through the circuit previously traced.

Shortly after a new card feed is initiated, cam contacts FC—4 (Fig. 1d) close, energizing relay coil B, causing closure of contacts B—2 which maintain B energized after FC—4 open. The stick circuit for B is completed through the LH reset contacts 190 now closed. The energization of B also closes relay contacts B—1 and a circuit is completed through the escapement contacts 154 of the punch, via wire 305 to the readout device of the punch, generally designated 306. The brush of the readout strip will be standing on the first column at which punching is to commence and the punch selector magnets 307 will be energized in the customary manner under the control of the LHRO readout to control product punching. Energization of such punch selector magnets under interposer action effects closure of contacts 308 and causes the energization of the punch magnet 237. Punching continues until the card reaches beyond the last column position in the punch, at which time punch contacts P—5 become closed to energize relay coil K, thereby effecting closure of relay contacts K—1 and energizing the eject magnet 151 in the punch (see Fig. 1d). The punched card is thereupon ejected from the punch and upon such eject action punch contacts P—3 close to effect energization of the punch clutch magnet 143 when cam contacts CC—3 close. This will present the following card to punching position.

What I claim is:

1. In a multiplying machine of the differentially timed impulse type with factor manifesting means for both factors and emitting multiplying means and including the combination wherein the emitting multiplying means comprises emitting commutator means having a plurality of conducting surfaces thereon with electrical connections between different surfaces, a plurality of output and input brushes cooperating with the commutator means, means controlled only by the factor manifesting means for one factor for setting the brushes in combinations related solely and only to a manifested factor digit, an input line commonly connected to the input brushes of the commutator means and output lines one for each digit of the other manifested factor connected to the output brushes, and impulse flow selecting means controlled by the factor manifesting means for the other factor connected to the aforesaid output lines for effecting further impulse selection.

2. The invention set forth in claim 1 wherein multiple sets of output lines are provided, one set for left hand components of products and the other set for right hand components of products with the lines of each set related to corresponding multiplicand digital values, said sets of lines extending to and cooperating with said other factor manifesting means.

3. In a differentially timed impulse type of multiplying machine having multiplicand representing devices and multiplier representing devices for controlling partial products impulse flow in accordance with multiplicand and multiplier values entered therein, the combination of impulse emitting means comprising commutator means and shiftable brushes cooperating therewith for controlling emission of differentially timed impulses representative of products of all digits by all digits of a notation, circuits through said commutator means including said brushes, one of said brushes in each circuit being a lead in brush and another of said brushes being a lead out brush, means controlled by the multiplier factor representing devices for shifting both the lead in and the lead out brushes in all of said circuits in accordance with a digital multiplier value, and means controlled by the multiplicand representing devices for selecting the commutator circuits which are to be effective in accordance with a represented multiplicand value.

4. Machine according to claim 3 wherein said shiftable brushes are settable combinationally and wherein said circuits include output lines connected to the lead out brushes, one line for each output brush and for each digit of a notation in the multiplicand.

5. Machine according to claim 3 wherein said shiftable brushes are settable combinationally and wherein said circuits include sets of output lines connected to the lead out brushes, one set for left hand components of products and the other set for right hand components of products.

6. The machine according to claim 3 wherein the lead in brushes are connected to a source of power through a common line and wherein the lead out brushes are connected to the means controlled by multiplicand representing devices by separate lines.

7. In a multiplying machine comprising multiplier factor manifesting means, multiplicand factor manifesting means, switching means controlled by said multiplicand factor manifesting means, and result receiving means, the combination of impulse emitting means, lines from said emitting means to the switching means for the multiplicand factor, one line pertaining to each digital multiplicand amount, said emitting means comprising emitting, commutating sections in each of said lines having conducting surfaces thereon disposed so that in one cycle of operation they are potentially capable of emitting differentially timed impulses representative of any product component amount based upon a single digital multiplicand line amount and any digital multiplier amount, brushes cooperating with said commutating sections and brush shifting means controlled by the manifesting means for the multiplier factor and in accordance with the digital value of a multiplier amount for selecting which conducting surfaces on commutating sections of each line are to be effective for the emission of differentially timed impulses representative of the product component of the multiplier manifested digit and multiplicand digital line amounts.

JAMES W. BRYCE.